(12) United States Patent
Iwata

(10) Patent No.: US 6,226,583 B1
(45) Date of Patent: May 1, 2001

(54) CONTROL DEVICE FOR CONTINUOUSLY VARIABLE TRANSMISSION

(75) Inventor: Toru Iwata, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/158,499

(22) Filed: Sep. 23, 1998

(30) Foreign Application Priority Data

Sep. 25, 1997 (JP) .................................................... 9-260068

(51) Int. Cl.[7] .............................. G06F 7/00; G06F 17/00; G06F 19/00
(52) U.S. Cl. ........................... 701/51; 701/52-54; 701/60; 701/61; 701/65; 701/66; 701/71; 701/72; 701/74; 701/78; 701/82; 701/83; 701/84; 477/45; 477/97; 180/197
(58) Field of Search .................. 701/51, 52, 53, 701/54, 60, 61, 65, 66, 71, 72, 74, 78, 82, 83, 84; 477/45, 97; 180/197

(56) References Cited

U.S. PATENT DOCUMENTS

| | | | |
|---|---|---|---|
| Re. 36,186 | * | 4/1999 | White et al. .......................... 477/108 |
| 5,127,501 | * | 7/1992 | Arikawa ............................... 192/1.22 |
| 5,519,617 | * | 5/1996 | Hughes et al. ................... 364/426.03 |
| 5,788,599 | * | 8/1998 | Adachi et al. ........................... 477/45 |
| 5,873,802 | * | 2/1999 | Tabata et al. ........................... 477/92 |
| 6,009,967 | * | 1/2000 | Hrovat .................................. 180/197 |
| 6,059,688 | * | 5/2000 | Nozaki et al. ........................... 477/97 |
| 6,077,190 | * | 6/2000 | Tabata et al. ........................... 477/97 |

FOREIGN PATENT DOCUMENTS

| | | | |
|---|---|---|---|
| 0443591 | * | 8/1991 | (EP) . |
| 8-338490 | | 12/1996 | (JP) . |

* cited by examiner

Primary Examiner—William A. Cuchlinski, Jr.
Assistant Examiner—Ronnie Mancho
(74) Attorney, Agent, or Firm—Foley & Lardner (57) ABSTRACT

A continuously variable transmission of an automobile which varies the drive ratio arbitrarily between an input axis and an output axis is combined with a traction control device for example which performs braking corresponding to vehicle running conditions and irrespective of the accelerator pedal depression. A microprocessor calculates the vehicle speed from the rotation speed of the output axis, calculates the target drive ratio depending on the vehicle speed, and controls the drive ratio of the continuously variable transmission to be equal to the target ratio. When the brake operation device performs braking, fluctuation of the drive ratio based on the rotation variation of the output axis is prevented by the correction of the drive ratio in the upshift direction.

8 Claims, 10 Drawing Sheets

5RL, 5RR, 5FL, 5FR WHEEL SPEED SENSOR
6 ROTATION SENSOR
7 ROTATION SENSOR
8 ROTATION SENSOR
41 THROTTLE OPENING SENSOR
42 AIR FLOW METER
44 FUEL INJECTOR
45 AUXILIARY THROTTLE
46 SPARK PLUG
47 BRAKE PRESSURE SENSOR

CONTROL DEVICE FOR CONTINUOUSLY VARIABLE TRANSMISSION

The contents of Tokugan Hei 9-260068, with a filing date of Sep. 25, 1997 in Japan, are hereby incorporated by reference.

FIELD OF THE INVENTION

This invention relates to a drive ratio control for a continuously variable transmission of a vehicle. More particularly, it relates to the control of the drive ratio during traction control accompanying braking.

BACKGROUND OF THE INVENTION

In a toroidal continuously variable transmission for a vehicle such as that disclosed in U.S. Pat. No. 5,542,890, there is a tendency for the real drive ratio to diverge from the target drive ratio depending on the direction or size of transmitted torque, due to slackness of the bearings supporting the power rollers or the elastic deformation of the trunnions. Specifically, a deviation towards upshift tends to occur when the input torque is decreasing and a deviation towards downshift tends to occur when the input torque is increasing. These deviations, that is to say, the drive ratio error is large when the input torque is large.

In this context, Tokkai Hei 8-338490 published in 1996 by the Japanese Patent Office discloses the feedback correction of drive ratio error on the basis of the correction value TS1 calculated from a target drive ratio RTO and an input torque Tin to the transmission.

The target torque RTO is obtained from the vehicle speed VSP and throttle opening TVO of the engine.

However this type of drive ratio control creates the following problems when applied to vehicles provided with a traction control device which accompanies braking.

A traction control device which accompanies braking decreases the engine output corresponding to the slip of the drive wheel and operates braking of the vehicle wheels so that grip is not lost with respect to the road surface. The basis of such a device lies in the application of the braking if drive wheel slip is detected even when the vehicle is accelerating due to depression of the accelerator pedal.

Hence for example if traction control is applied during acceleration and the braking is applied, the rotation speed of the drive wheels will temporarily decrease. As a result, the toroidal continuously variable transmission will temporarily vary the drive ratio in the direction of downshift in a similar way to when there has been an increase in engine torque.

Since this is not a result of an actual loss of vehicle speed, the variation of the drive ratio is either totally unnecessary or leads to so called hunting in which the drive ratio oscillates until it finally falls to an appropriate value.

SUMMARY OF THE INVENTION

It is therefore an object of this invention to suppress the variation of the drive ratio when braking is applied by traction control or the like.

In order to achieve the above object, this invention provides a transmission control device for use with such a vehicle that has a continuously variable transmission which arbitrarily varies a drive ratio between an input axis and an output axis and has a braking operation device which performs braking corresponding to a braking condition irrespective of a depression of an accelerator pedal.

The transmission control device comprises a sensor for detecting whether or not the braking is being performed, and a microprocessor programmed to calculate a vehicle speed from a rotation speed of the output axis, control the drive ratio depending on the vehicle speed, and correct the drive ratio in the direction of upshift when the braking is being performed.

It is preferable that the microprocessor is further programmed to calculate a target drive ratio from the vehicle speed, calculate a basic value of the drive ratio control depending on the target drive ratio, calculate a correction value based on the target drive ratio and the torque input to the input axis, control the drive ratio of the continuously variable transmission based on the sum of the correction value and the basic value, and modify the compensating value in the upshift direction when the braking is being performed.

It is further preferable that the sensor comprises a sensor which detects a brake pressure applied by the braking operation device, and the microprocessor is further programmed to modify the correction amount in the direction of upshift in response to an increase in the braking pressure.

The braking operation device may comprise a traction control device which performs braking and reduces engine output in response to a slip of a drive wheel of the vehicle.

The braking operation device may comprise an anti-lock braking device which performs braking depending in response to a slip of a drive wheel of the vehicle.

The braking operation device may comprise a lateral slip prevention device which performs braking in response to understeering or oversteering of the vehicle.

When the brake operation device comprises a brake actuator and a controller which outputs a pressure increasing signal and a pressure decreasing signal to the brake actuator so as to increase and decrease a pressure which the brake actuator generates, the microprocessor may be programmed to estimate a brake pressure applied by the brake actuator based on a duration period of the pressure increasing signal and a duration period of the pressure decreasing signal, instead of detecting the brake pressure by the sensor.

The details as well as other features and advantages of this invention are set forth in the remainder of the specification and are shown in the accompanying drawings.

DESCRIPTION OF THE PREFERRED EMBODIMENTS

Figure 1:
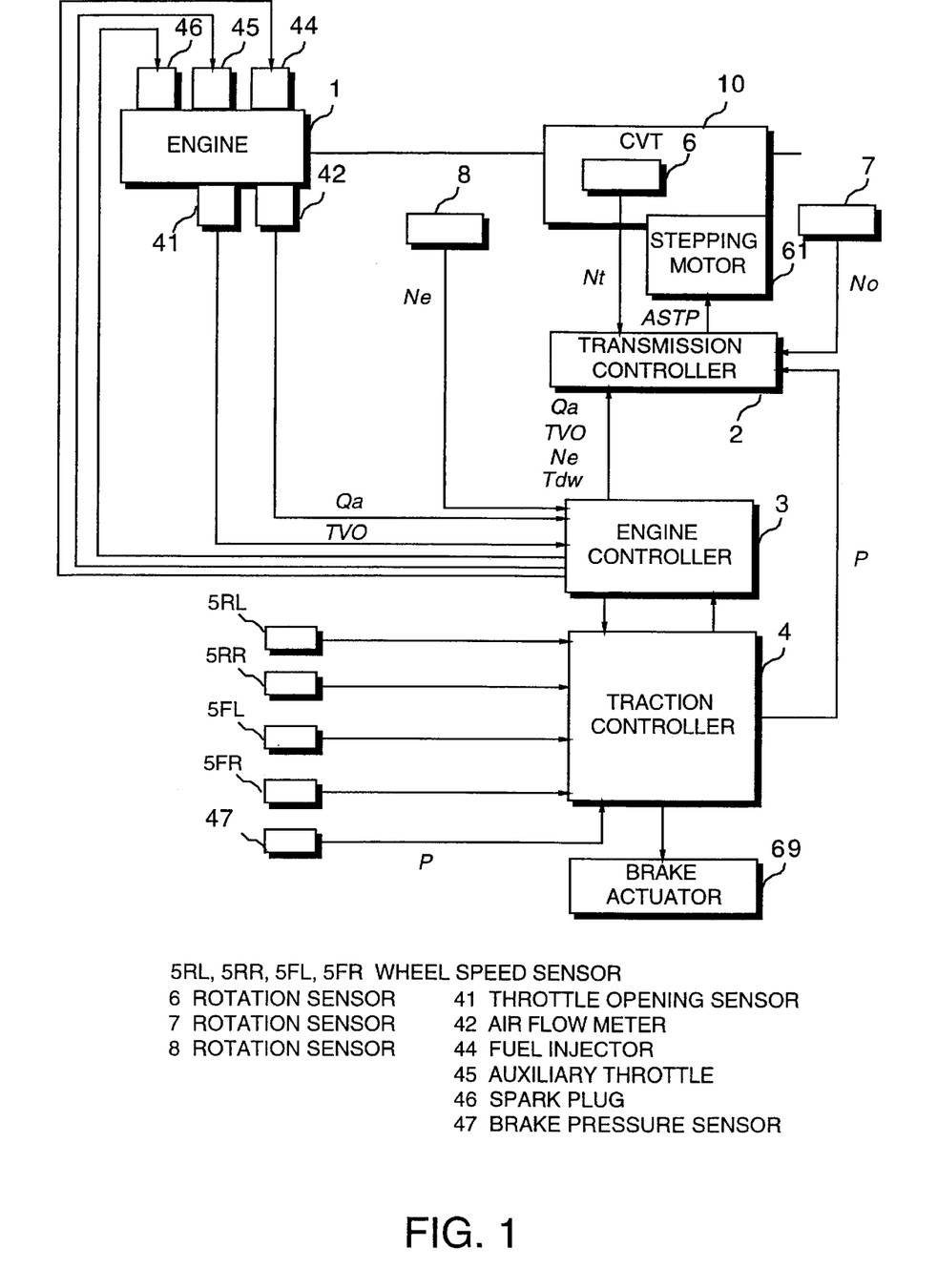
FIG. 1 is a schematic diagram of a drive ratio control device according to this invention.

Referring to FIG. 1 of the drawings, the output rotation of a vehicle engine 1 is transmitted to rear wheels which act as drive wheels of the vehicle through the toroidal continuously variable transmission 10.

An engine controller 3 executes torque-down control which reduces the output of the engine 1 based on a torque-down signal from a traction controller 4.

The reduction of the output of the engine 1 is achieved by methods such as cutting the supply of fuel to a fuel injector 44, closing an auxiliary throttle 45 or retarding the ignition timing of a spark plug 46.

In order to control the output of the engine 1, signals representing running conditions of the vehicle are input into the engine controller 3 from the sensors such as a throttle sensor 41 which detects a throttle opening TVO of the engine 1, an air flow meter which detects an intake air amount Qa to the engine 1, and a rotation speed sensor which detects an engine rotation speed Ne.

Signals from the wheel speed sensors 5RL and 5RR which detect a rotation speed of rear wheels which are the drive wheels of the vehicle, and from wheel speed sensors 5FL and 5FR which detect a rotation speed of front wheels which are the driven wheels of the vehicle are input into the traction controller 4. Another signal is input to the traction controller 4 from a pressure sensor 47 which detects a brake pressure P supplied to wheel cylinders of the wheels from a brake actuator 69.

The traction controller 4 calculates a slip ratio of the drive wheels based on the rotation speed ratio of the drive wheels and the driven wheels. When the slip ratio exceeds a first fixed value, a torque-down signal is output to the engine controller 3. When the slip ratio exceeds a second fixed value which is larger than the first fixed value, a brake signal is output to the brake actuator 69.

The brake actuator 69 supplies high pressure to the wheel cylinder of each vehicle wheel based on the brake signal and performs braking of each wheel. The supplied pressure increases depending on increases in the slip ratio.

On the other hand, when the slip ratio falls below the second fixed value, the traction controller 4 terminates output of the brake signal. Furthermore when the slip ratio falls below a first fixed value, output of the torque-down signal is terminated.

The toroidal continuously variable transmission 10 varies the drive ratio by the step motor 61 which is controlled by the transmission controller 2.

The transmission controller 2 is connected to the engine controller 3 and receives signals therefrom indicative of the engine rotation speed Ne and the intake air amount Qa or the throttle opening TVO. Since the intake air amount Qa and the throttle opening TVO express the load of the engine 1, it is sufficient to transmit either one of these signals. The torque-down amount Tdw which corresponds to the torque-down control performed by the engine controller 3 is also input into the transmission controller 2. Further, the output rotation speed No and the input rotation speed Nt of the toroidal continuously variable transmission 10 are input to the traction controller 2 from rotation sensors 6 and 7.

The transmission controller 2 calculates a target drive ratio RTO based on these input signals and outputs a corresponding signal to the step motor 61.

Figure 2:
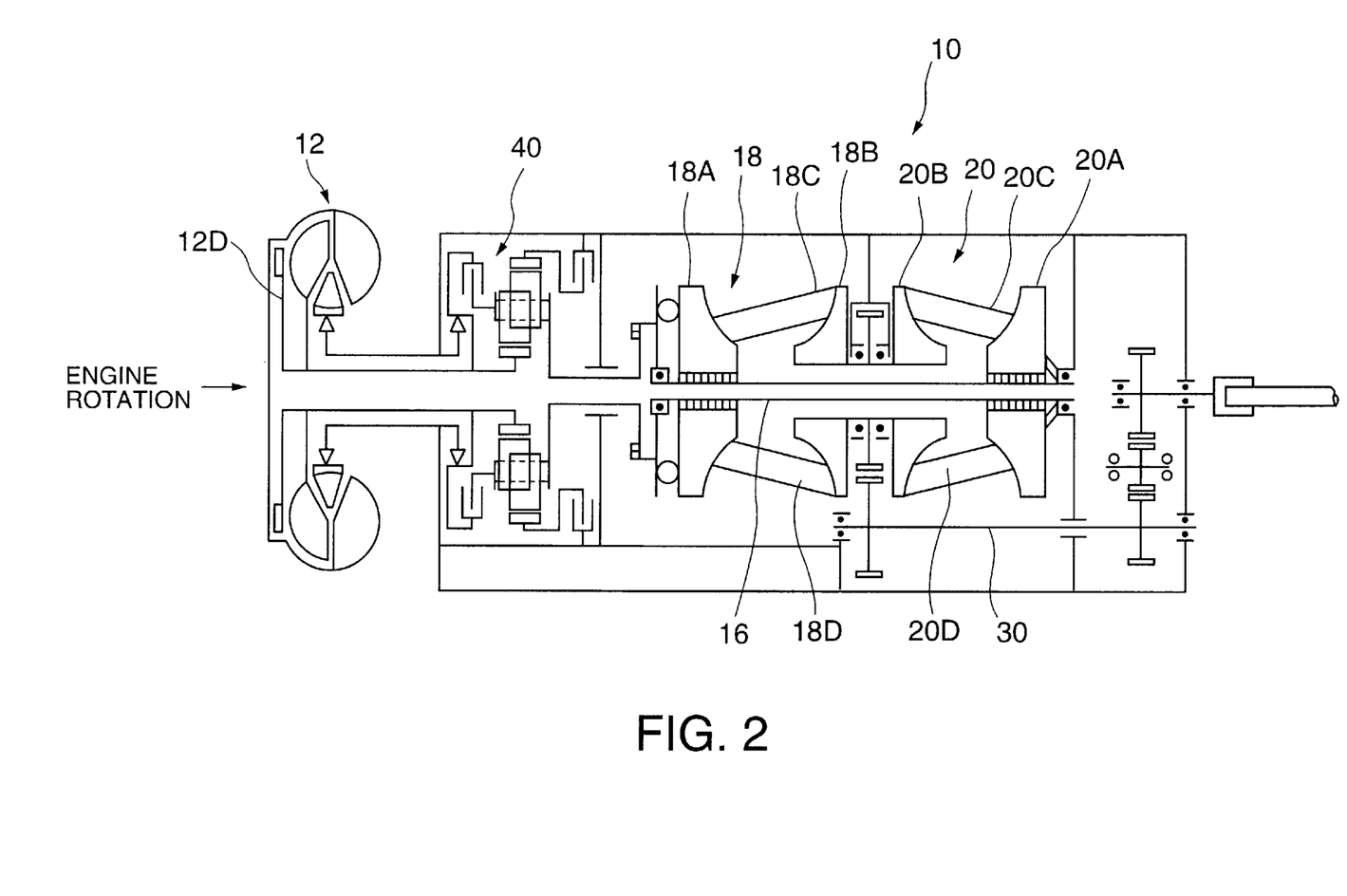
FIG. 2 is a schematic longitudinal section view of a toroidal continuously variable transmission to which this invention is applied.

As shown in FIG. 2, the continuously variable transmission 10 is connected to the engine 1 via a torque converter 12 and a forward/reverse change-over mechanism 40.

The continuously variable transmission 10 comprises a first speed change unit 18 and a second speed change unit 20. The first speed change unit 18 comprises an input disk 18A connected to the input axis 29, an output disk 18B connected to the output axis 30 and a pair of power rollers 18C inserted between the above disks. The second speed change unit 20 comprises an input disk 20A connected to the input axis 29, an output disk 20B connected to the output axis 30 and a pair of power rollers inserted between the above disks.

Figure 3:
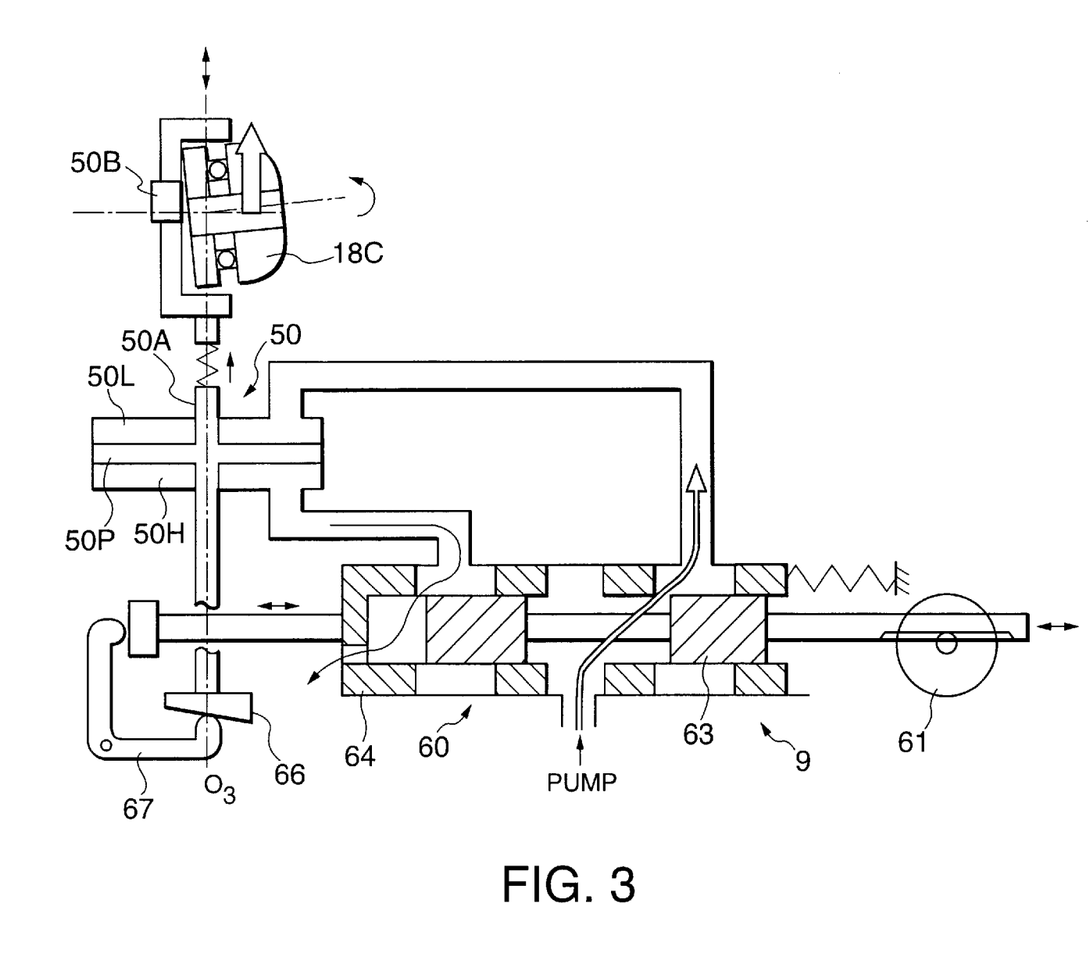
FIG. 3 is a schematic diagram of a power roller, an oil pressure actuator and control valve for expressing the motive principle of the toroidal continuously variable transmission.

As shown in FIG. 3, the power rollers 18C are supported by a rotation axis 50B in the form of an offset crank shaft. In the figure, the rotation axis 50B is depicted overstating the deformation due to the deformation pressure applied in the direction of the arrow depending on reductions in input torque. The power rollers 18C rotate about the leading part of the rotation axis 50B on the fulcrum and oscillate in a fixed range with respect to the trunnion 50D about the base part of the rotation axis 50B.

The trunnion 50D is connected to the trunnion axis 50A. The trunnion axis 50A is driven in the vertical direction by the actuator 50.

Corresponding to the vertical displacement of the trunnion axis 50A, the power rollers 18C vary the angle of gyration and the contact radii of the input disk 18A and output disk 18B vary. As a result, the drive ratio of the transmission 10 varies continuously. The other power rollers 18C and 20C are respectively driven by the trunnion and the actuator in the same way.

The actuator 50 displaces the piston 50P connected to the trunnion axis 50A depending on the oil pressure from a control valve 60. For this purpose, an oil chamber 50L and an oil chamber 50H are provided in the actuator 50. The control valve 60 is provided with a spool 63 in order to selectively connect an oil pump or a drain to these oil chambers 50L and 50H.

The spool 63 displaces corresponding to the rotation angle of the step motor 61 which rotates corresponding to a command signal from the transmission controller 2. When high pressure is supplied to the oil chamber 50H as a result of this displacement, the trunnion axis 50A rises and the drive ratio is reduced. In this context, a reduction in the drive ratio means an upshift. On the other hand, when high pressure is supplied to the oil chamber 50L, the trunnion axis falls and increases the drive ratio. In this context, the increase in the drive ratio means a downshift.

The spool 63 is fitted into the sleeve 64. The displacement of the trunnion axis 50A is fed back to the control valve 60 as a displacement of the sleeve 64 through a cam 66 and link 67.

Tokkai Hei 8-338490 mentioned above discloses the above construction of the toroidal continuously variable transmission 10, the actuator 50, the control valve 60 and the step motor 61.

Next the drive ratio control process performed by the transmission controller 2 will be explained.

Figure 9:
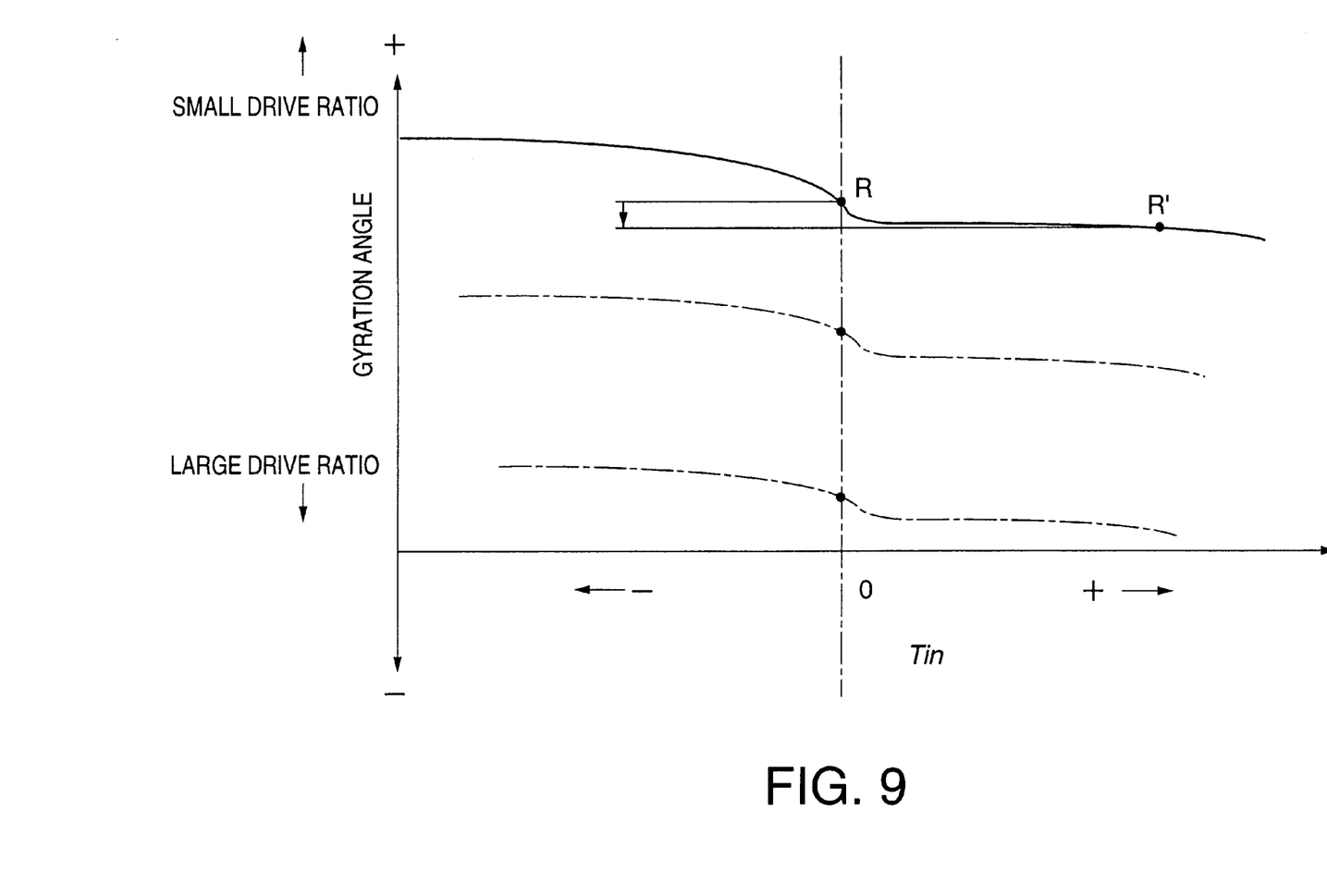
FIG. 9 is a diagram outlining the characteristics of the torque shift of the toroidal continuously variable transmission.

When the input torque of the toroidal continuously variable transmission 10 reduces, as shown in FIG. 3, an upward force is applied to the leading part of the rotation axis 50B as shown in FIG. 3. As shown in the figure, the rotation axis 50B undergoes elastic deformation as a result of this upward force. Hence the angle of gyration of the power rollers 18C(20C) varies. The upward force also creates elastic deformation in the trunnion axis 50A and further varies the angle of gyration of the power rollers 18C(20C). Apart from this, the angle of gyration of the power rollers 18C(20C) varies due to the slackness of the bearing giving axial support to the power rollers 18C. The variation of the angle of gyration of the power rollers, as shown in FIG. 9, brings a deviation of drive ratio according to the drive ratio and the input torque Tin.

For example, if the target drive ratio of the transmission 10 is taken to be R, when the input torque Tin of the transmission 10 is positive, in other words during acceleration, the angle of gyration of the power roller decreases in response to increases in transmitted torque. Thus the drive ratio deviates in the shift-down direction as shown by R'. This deviation is generated at all target drive ratios shown on the broken lines in the figure.

Figure 8:
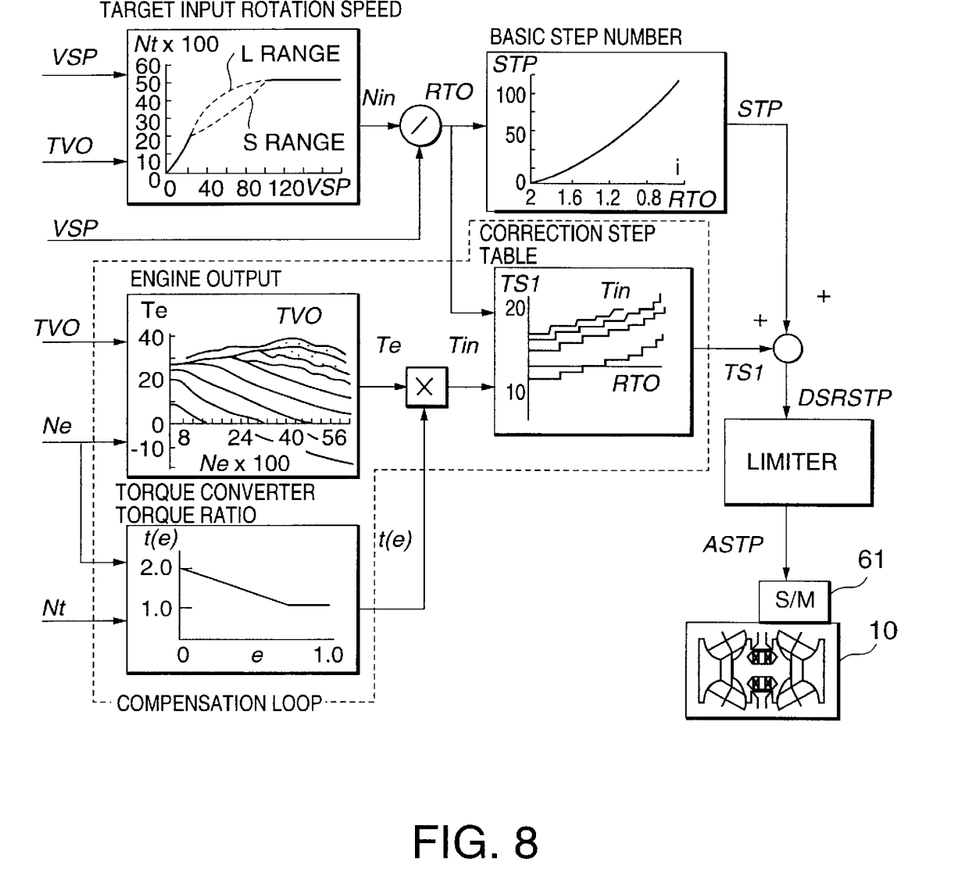
FIG. 8 is a block diagram outlining the drive ratio control process preformed by the transmission controller.

In order to correct such drive ratio error deviations, the transmission controller 2 searches for a correction amount TS1 referring to a correction step table shown In FIG. 8 based on the target drive ratio RTO and the input torque Tin. The map is predetermined on the basis of experimentation.

Figure 10:
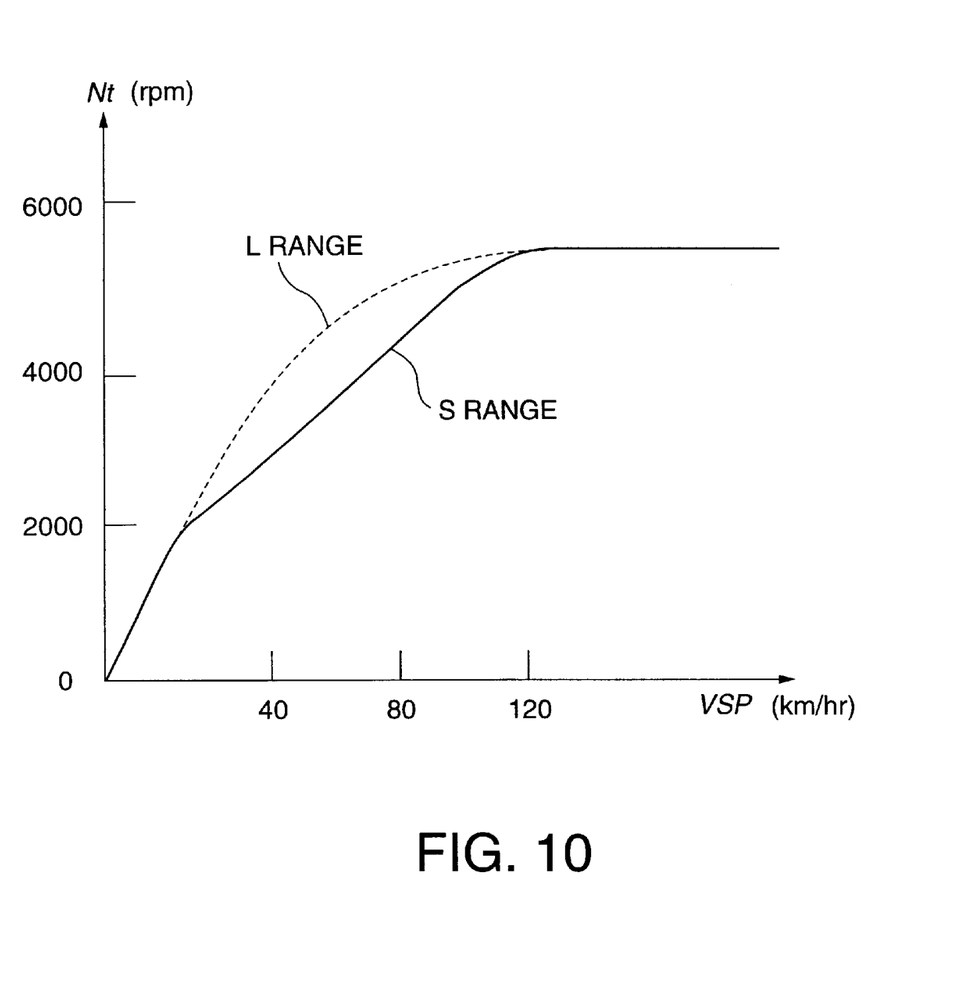
FIG. 10 is a diagram showing the characteristics of a drive ratio map stored in the transmission controller.

The target drive ratio RTO is set depending on vehicle speed VSP as shown in FIG. 10. This map is pre-stored in the transmission controller. While referring to the map, the target variable ratio RTO is obtained based on the vehicle speed VSP calculated from the output rotation speed No of the transmission 10.

In parallel with the calculation of the correction amount TS1, the transmission controller 2 calculates a basic step number STP of the step motor 61 from the target drive ratio RTO on the basis of a preset non-load step table whose characteristics are shown in FIG. 8.

By the addition of the correction amount TS1 to the basic step number STP, the target step number DSRSTP of the step motor 61 is calculated. After applying a limit processing to this value, the resultant value is output to the step motor 61 as a command signal ASTP.

This invention has the object of correcting the correction amount TS1 to the upshift side when braking is applied by traction control during drive ratio control as described above.

Next this control process will be described referring to the flow charts in FIGS. 4–7.

Figure 4:
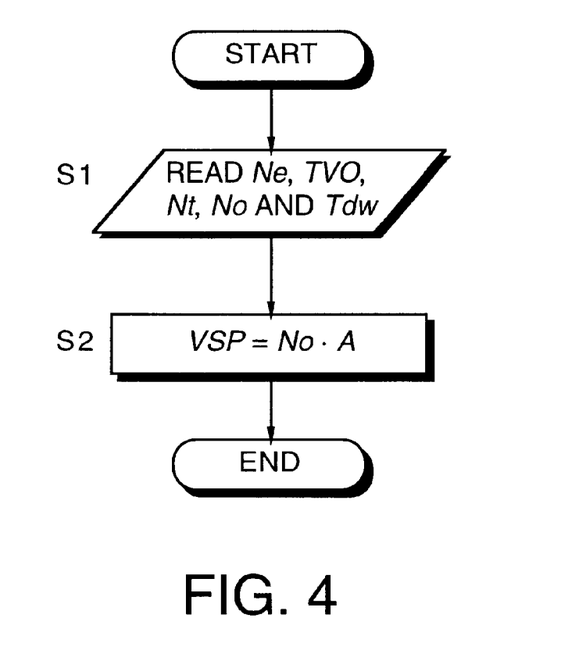
FIG. 4 is a flow chart describing a vehicle speed calculating process performed by a transmission controller according to this invention.

FIG. 4 shows a detection process of the running conditions of the vehicle.

First, in a step S1, the engine rotation speed Ne, the throttle opening TVO and the amount of torque-down Tdw are read from the output signals of the engine controller 3. Furthermore the output rotation speed No and the input rotation speed Nt of the continuously variable transmission 10 are read from the output signal from the rotation sensors 6 and 7.

In a step S2, the vehicle speed VSP is calculated by multiplying the output rotation speed No with the conversion constant A.

Figure 5:
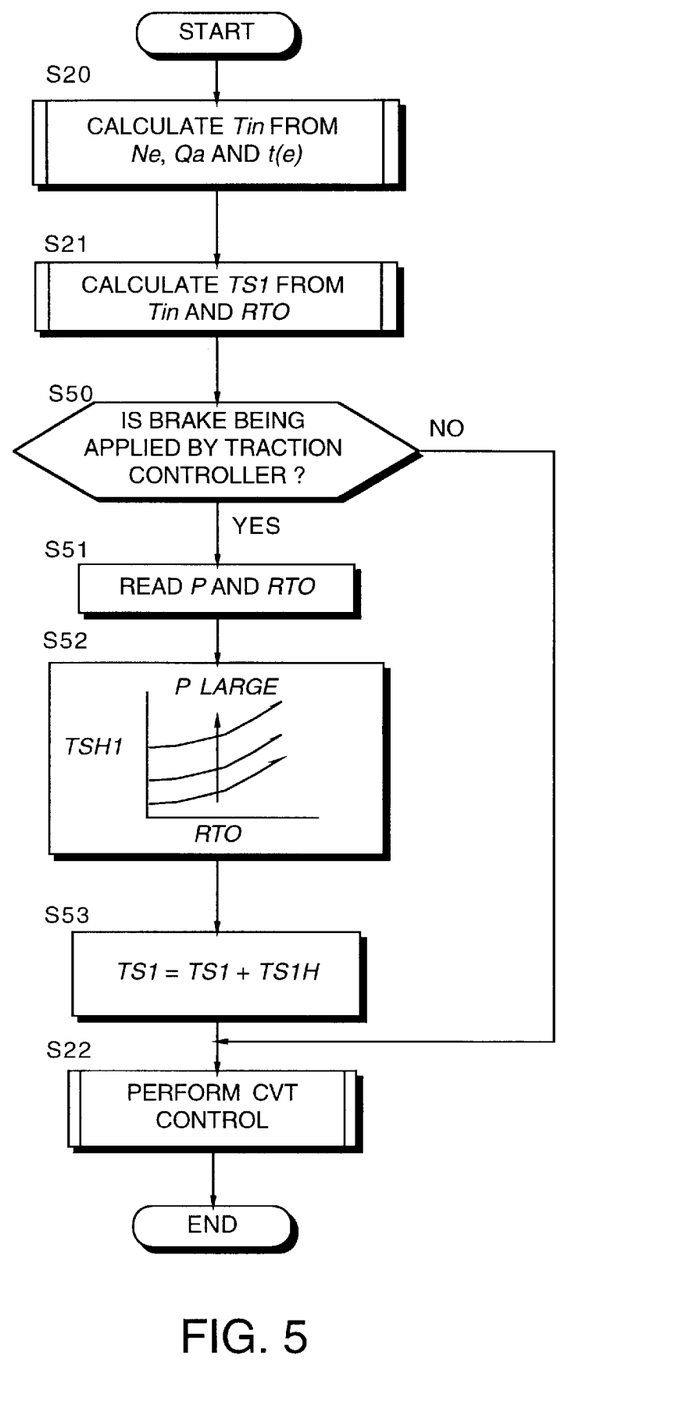
FIG. 5 is a flow chart describing a drive ratio control process performed by the transmission controller.

FIG. 5 shows a drive ratio control process based on the running conditions of the vehicle determined by steps S1 and S2.

First, in a step 20, the input torque Tin to the continuously variable transmission 10 is estimated. The input torque Tin takes a positive value during acceleration, that is to say, when torque is transmitted to the output axis 30 from the input axis 16 of the continuously variable transmission. During deceleration, that is to say when torque transmitted to the input axis 16 from the output axis 30, input torque takes a negative value.

The estimation of input torque Tin is calculated on the basis of the formula below, in the same way as disclosed in the aforesaid Tokkai Hei 8-338490, from the output torque Te of the engine 1, the torque ratio t(e) of the torque converter 12 and the amount of torque-down Tdw.

$$Tin = (Te - Tdw) \cdot T(e)$$

The amount of torque-down Tdw is the decrease in the amount of torque corresponding to the torque-down signal which the traction controller 4 outputs to the engine controller 3.

In a step S21, the correction amount TS1 is calculated for the command signal to the step motor 61 in order to correct the deviation of the drive ratio generated in the continuously variable transmission 10.

The process of the steps S20 and S21 corresponds to the part shown as a compensation loop in FIG. 8.

In a next step S50, it is determined whether or not braking by the traction controller 4 is being performed.

If braking is being performed, the process proceeds to steps S51–S53.

In the step S51, the brake pressure P detected by the pressure sensor 47 and the target drive ratio RTO are read.

In the step S52, a compensating amount TS1H is retrieved based on the brake pressure P and the target drive ratio RTO while referring to a pre-stored map.

The map is set, as shown in FIG. 5, so that the compensating amount TS1H increases depending on increases in the brake pressure P. In the same way, the compensating amount TS1H increases depending on increases in the target drive ratio RTO. The compensating amount TS1H is always a positive value.

In the step 53, the amending amount TS1H is added to the correction amount TS1 calculated in the step S21 and a new correction amount TS1 is obtained.

As can be understood from FIG. 9, a drive ratio error is generated to the downshift side during acceleration. As a result, the correction amount TS1 equals the correction amount to the upshift side. Therefore the addition of the compensating amount TS1H to the correction amount TS1 is an increase in the correction amount to the upshift side.

In the step S53, after correcting the correction amount TS1, the process proceeds to a step S22. Furthermore if it was decided that braking by traction control is not being performed in the step S50, the steps S51–S53 are bypassed and the process proceeds to the step S22.

In the step S22, the target step number DSRSTP of the step motor 61 is calculated by calculating the basic step number STP and adding the correction amount TS1. The command signal ASTP is then calculated by performing limit processing in the sub-routine in FIG. 6.

Figure 6:
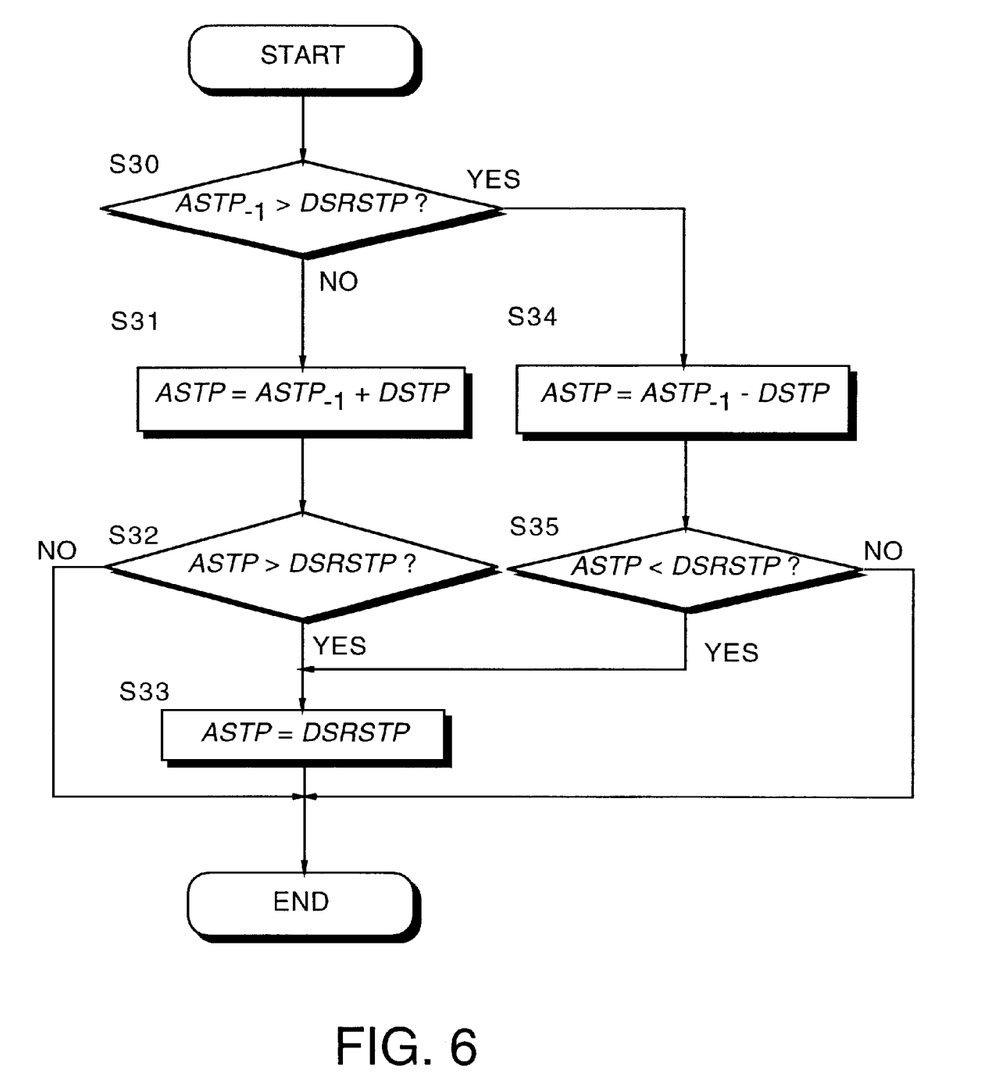
FIG. 6 is a flow chart demonstrating the sub-routine carried out by the transmission controller in the variable control process.

This sub-routine starts with a step 30 for comparing the target step number DSRSTP with the command signal $ASTP_{-1}$ which is the value of ASTP calculated in the immediately preceding occasion when the process was performed.

When the previous value $ASTP_{-1}$ of the command signal is less than the target step number DSRSTP, a fixed variation amount DSTP is added to the previous value in the step S31 and the command signal ASTP is calculated.

Then in the step S32, the command signal ASTP is compared with the target step number DSRSTP, and if the command signal ASTP is still less than the target number DSRSTP, the sub-routine is terminated at that point. If the command signal ASTP is greater than the target step number DSRSTP, the command signal ASTP is amended to the target step number DSRSTP in a step S33 and the process is terminated.

On the other hand, in the step S30, if the previous value $ASTP_{-1}$ is greater than the target step number DSRSTP, in a step S34, the command signal ASTP is calculated by subtracting the fixed variation amount DSTP from the previous value $ASTP_{-1}$.

In a next step S35, the target step number DSRSTP and the command signal ASTP are compared, and if the command signal ASTP is still greater than the target step number DSRSTP, the subroutine is terminated. When the command signal has become less than the target step number DSRSTP, the command signal ASTP is amended to the target step number DSRSTP and the sub-routine is terminated.

In this way, the command value ASTP varies by the fixed variable amount DSTP each time the process is executed until the target step number DSRSTP is reached.

Figure 7:
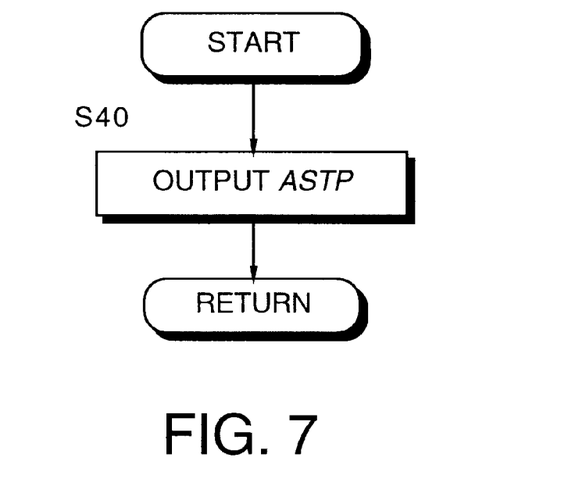
FIG. 7 is a flow chart demonstrating a sub-routine performed by the transmission controller in the drive ratio control process.

In this way, the final command signal is output to the step motor 61 in a step S40 in FIG. 7.

Figure 11A:
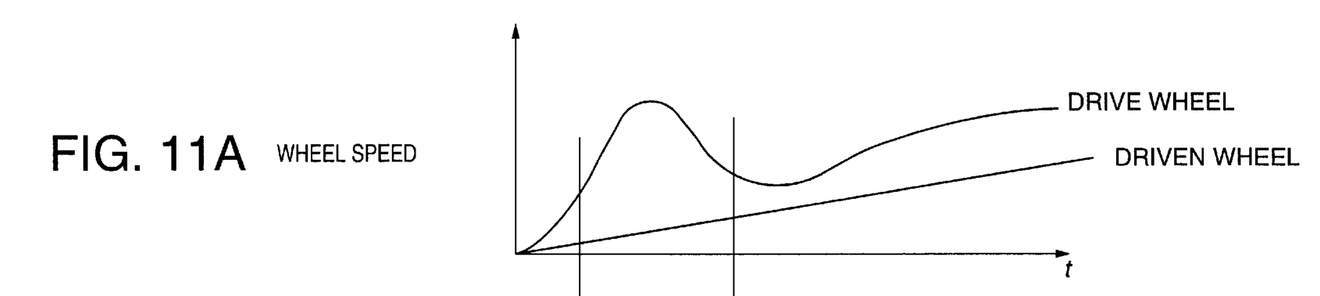
FIGS. 11A–11C is a timing chart demonstrating a result of control by the drive ratio control device.
Figure 11B:
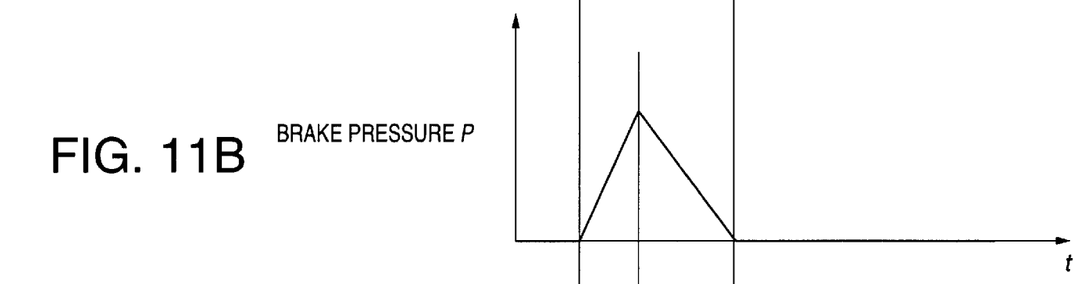

For example when a drive wheel slips during acceleration as shown in FIG. 11A and braking is applied by the traction controller 3 as shown in FIG. 11B, the vehicle speed VSP as searched from the drive wheel speed is reduced. In conventional drive ratio control, there is a tendency for the drive ratio to deviate temporarily in the downshift direction as shown by the broken line in FIG. 11C.

Figure 11C:
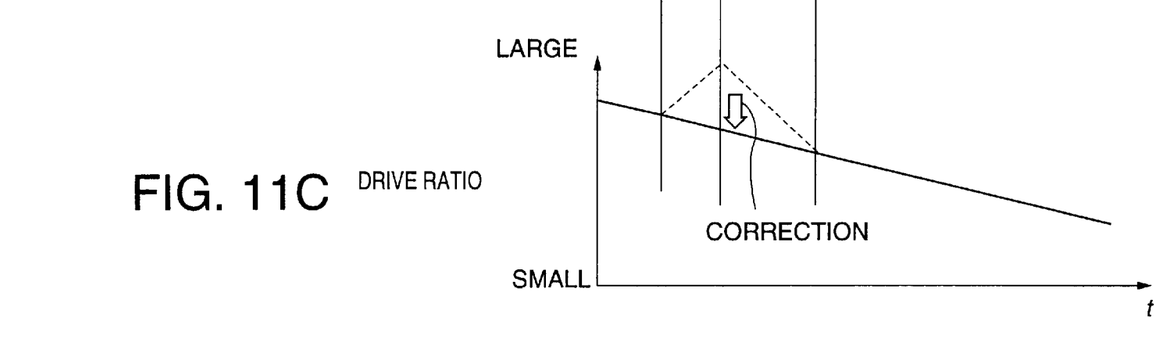

However since the drive ratio is compensated in the upshift direction by the compensating amount TS1H in this invention, the deviation in the downshift direction of the drive ratio is suppressed and fluctuation of the drive ratio is prevented.

In the embodiment above, the correction amount TS1 was corrected by the compensating amount TS1H. However it is also possible to increase the target step number DSRSTP or the basic step number STP of the step motor 61 in the direction of upshift.

Also instead of detecting the brake pressure P with a pressure sensor 47, it is possible to calculate the increasing pressure period tin and the decreasing pressure period td of the brake actuator 69 by the following formula:

$$P=\Sigma(Kin \cdot tin - Kd \cdot td)$$

where, Kin and Kd are constants.

Furthermore the embodiment above is directed to the braking operation by the traction control. However this invention can be adapted to all cases of brake operation which is performed when the accelerator pedal is depressed. Examples of these include anti-lockup brake systems (ABS) and vehicle dynamics control system (VDC system). A VDC system reduces the phenomena of excessive over-steering or under-steering caused when taking emergency evasive action or when travelling on a curve with a slippery road surface. It applies braking in such a case and secures vehicle stability and prevents so-called lateral slip.

The corresponding structures, materials, acts, and equivalents of all means plus function elements in the claims below are intended to include any structure, material, or acts for performing the functions in combination with other claimed elements as specifically claimed. The embodiments of this invention in which an exclusive property or privilege is claimed are defined as follows:

What is claimed:

1. A transmission control device for use with a vehicle, said vehicle having a continuously variable transmission which varies a drive ratio between an input axis and an output axis and having a braking operation device which performs braking corresponding to a braking condition irrespective of a depression of an accelerator pedal, said transmission control device comprising:
    a sensor for detecting whether or not said braking is being performed, and
    a microprocessor programmed to:
        calculate a vehicle speed from a rotation speed of the output axis,
        control the drive ratio depending on the vehicle speed, and
        correct the drive ratio in the direction of upshift when said braking is being performed.

2. A transmission control device as defined in claim 1, wherein said microprocessor is further programmed to calculate a target drive ratio from said vehicle speed, calculate a basic value of drive ratio control depending on the target drive ratio, calculate a correction value based on the target drive ratio and a torque input to said input axis, control the drive ratio of said continuously variable transmission based on a sum of the correction value and the basic value, and said correction value modifies the drive ratio in the upshift direction when said braking is being performed.

3. A transmission control device as define in claim 2, wherein said sensor comprises a sensor which detects a brake pressure applied by said braking operation device, and said microprocessor is further programmed to modify the correction value in the direction of upshift in response to an increase in the braking pressure.

4. A transmission control device as defined in claim 1, wherein said braking operation device comprises a traction control device which performs braking and reduces engine output in response to a slip of a drive wheel of the vehicle.

5. A transmission control device as defined in claim 1, wherein said braking operation device comprises an anti-lock braking device which performs braking depending in response to a slip of a drive wheel of the vehicle.

6. A transmission control device as defined in claim 1, wherein said braking operation device comprises a lateral slip prevention device which performs braking in response to understeering or oversteering of the vehicle.

7. A transmission control device for use with a vehicle, said vehicle having a continuously variable transmission which varies a drive ratio between an input axis and an output axis and having a braking operation device which performs braking corresponding to a braking condition irrespective of a depression of an accelerator pedal, said brake operation device comprising a brake actuator and a controller which outputs a pressure increasing signal and a pressure decreasing signal to the brake actuator so as to increase and decrease a pressure which said brake actuator generates, said transmission control device comprising a microprocessor programmed to:
    calculate a vehicle speed from a rotation speed of the output axis,
    control the drive ratio depending on the vehicle speed,
    estimate a brake pressure applied by said brake actuator based on a duration period of the pressure increasing signal and a duration period of the pressure decreasing signal, and
    correct the drive ratio in the direction of upshift depending on the estimated braking pressure.

8. A transmission control device for use with a vehicle, said vehicle having a continuously variable transmission which varies a drive ratio between an input axis and an output axis and having a braking operation device which performs braking corresponding to a braking condition irrespective of a depression of an accelerator pedal, said transmission control device comprising:

means for detecting whether or not said braking is being performed, means for calculating a vehicle speed from a rotation speed of the output axis, means for controlling the drive ratio depending on the vehicle speed, and means for correcting the drive ratio in the direction of upshift when said braking is being performed.

* * * * *